(12) United States Patent
Keefe

(10) Patent No.: US 8,019,483 B2
(45) Date of Patent: Sep. 13, 2011

(54) SYSTEM AND METHOD FOR MANAGING THE DISTRIBUTED GENERATION OF POWER BY A PLURALITY OF ELECTRIC VEHICLES

(75) Inventor: Robert A. Keefe, Honeoye Falls, NY (US)

(73) Assignee: Current Communications Services, LLC, Rochester, NY (US)

( * ) Notice: Subject to any disclaimer, the term of this patent is extended or adjusted under 35 U.S.C. 154(b) by 442 days.

(21) Appl. No.: 12/243,388

(22) Filed: Oct. 1, 2008

(65) Prior Publication Data

US 2010/0079004 A1  Apr. 1, 2010

(51) Int. Cl.
*G05D 17/00* (2006.01)
*G05D 3/12* (2006.01)
(52) U.S. Cl. .......................... 700/286; 700/291; 700/295
(58) Field of Classification Search .................. 700/286, 700/296, 291, 295, 293; 363/15, 34; 705/412
See application file for complete search history.

(56) References Cited

U.S. PATENT DOCUMENTS

| | | | | |
|---|---|---|---|---|
| 4,302,750 | A * | 11/1981 | Wadhwani et al. | 340/870.02 |
| 5,572,438 | A * | 11/1996 | Ehlers et al. | 700/295 |
| 5,684,710 | A * | 11/1997 | Ehlers et al. | 700/293 |
| 5,696,695 | A * | 12/1997 | Ehlers et al. | 700/286 |
| 5,767,584 | A * | 6/1998 | Gore et al. | 290/1 R |
| 5,986,907 | A * | 11/1999 | Limpaecher | 363/61 |
| 6,233,137 | B1 * | 5/2001 | Kolos et al. | 361/603 |
| 6,347,027 | B1 * | 2/2002 | Nelson et al. | 361/64 |
| 6,522,031 | B2 * | 2/2003 | Provanzana et al. | 307/48 |
| 6,671,585 | B2 * | 12/2003 | Lof et al. | 705/37 |
| 6,696,925 | B1 * | 2/2004 | Aiello, Jr. | 340/870.02 |
| 6,697,240 | B2 * | 2/2004 | Nelson et al. | 361/64 |
| 6,900,556 | B2 * | 5/2005 | Provanzana et al. | 307/19 |
| 7,305,281 | B2 * | 12/2007 | Scott et al. | 700/286 |
| 7,402,978 | B2 * | 7/2008 | Pryor | 320/104 |
| 7,693,609 | B2 * | 4/2010 | Kressner et al. | 700/295 |
| 7,724,482 | B2 * | 5/2010 | Folts et al. | 361/19 |
| 7,792,613 | B2 * | 9/2010 | Kressner et al. | 700/286 |
| 2002/0084655 | A1 * | 7/2002 | Lof et al. | 290/44 |
| 2002/0103655 | A1 * | 8/2002 | Boies et al. | 705/1 |
| 2003/0006613 | A1 * | 1/2003 | Lof et al. | 290/44 |
| 2004/0158360 | A1 * | 8/2004 | Garland et al. | 700/286 |
| 2005/0125243 | A1 * | 6/2005 | Villalobos | 705/1 |
| 2006/0186669 | A1 * | 8/2006 | Ruggieri et al. | 290/2 |
| 2006/0259199 | A1 * | 11/2006 | Gjerde et al. | 700/295 |
| 2007/0086133 | A1 * | 4/2007 | Loucks et al. | 361/84 |

(Continued)

*Primary Examiner* — Michael D. Masinick
*Assistant Examiner* — Kelvin Booker
(74) *Attorney, Agent, or Firm* — Mel Barnes; Capital Legal Group, PLLC

(57) ABSTRACT

A system and method for managing the distributed generation of power from a plurality of vehicles is provided. In one embodiment, the method includes determining location information for the plurality of vehicles, determining that a demand for power in a first portion of the power grid has reached a power threshold, determining that the location information associated with a set of the plurality of vehicles satisfies a similarity threshold with the first portion of the power grid, and transmitting a request to a first group of vehicles in the set of vehicles to discharge power. In addition, the method may include receiving a response from at least some of the electric vehicles to which a request was transmitted, and determining whether to request the discharge of power from additional vehicles in the set of the plurality of vehicles based, at least in part, on the number of responses containing a confirmation of the discharge of power. The portion of the power grid may comprise a medium voltage power line or a substation.

31 Claims, 7 Drawing Sheets

U.S. PATENT DOCUMENTS

| | | | |
|---|---|---|---|
| 2007/0282495 A1* | 12/2007 | Kempton et al. | 701/22 |
| 2008/0219186 A1* | 9/2008 | Bell et al. | 370/254 |
| 2008/0219239 A1* | 9/2008 | Bell et al. | 370/351 |
| 2009/0012916 A1* | 1/2009 | Barnett | 705/412 |
| 2009/0093916 A1* | 4/2009 | Parsonnet et al. | 700/286 |
| 2009/0184689 A1* | 7/2009 | Kressner et al. | 320/162 |
| 2009/0187284 A1* | 7/2009 | Kreiss et al. | 700/295 |
| 2009/0187499 A1* | 7/2009 | Mulder et al. | 700/295 |
| 2009/0216387 A1* | 8/2009 | Klein | 700/295 |
| 2009/0222143 A1* | 9/2009 | Kempton | 700/291 |
| 2010/0012406 A1* | 1/2010 | Kressner et al. | 700/296 |
| 2010/0017043 A1* | 1/2010 | Kressner et al. | 700/296 |
| 2010/0019776 A1* | 1/2010 | Folts et al. | 324/539 |
| 2010/0023178 A1* | 1/2010 | Kressner et al. | 700/295 |
| 2010/0052429 A1* | 3/2010 | Nethery, III | 307/85 |
| 2010/0076835 A1* | 3/2010 | Silverman | 705/14.33 |
| 2010/0082277 A1* | 4/2010 | Ballard | 702/63 |
| 2010/0082464 A1* | 4/2010 | Keefe | 705/32 |
| 2010/0100342 A1* | 4/2010 | Kressner et al. | 702/62 |
| 2010/0106332 A1* | 4/2010 | Chassin et al. | 700/278 |
| 2010/0106641 A1* | 4/2010 | Chassin et al. | 700/295 |
| 2010/0107173 A1* | 4/2010 | Chassin | 718/104 |
| 2010/0114387 A1* | 5/2010 | Chassin | 700/286 |
| 2010/0141030 A1* | 6/2010 | Kaestle | 307/20 |
| 2010/0228601 A1* | 9/2010 | Vaswani et al. | 700/295 |
| 2010/0235209 A1* | 9/2010 | Vaswani et al. | 705/7 |
| 2010/0256830 A1* | 10/2010 | Kressner et al. | 700/296 |

* cited by examiner

SYSTEM AND METHOD FOR MANAGING THE DISTRIBUTED GENERATION OF POWER BY A PLURALITY OF ELECTRIC VEHICLES

FIELD OF THE INVENTION

The present invention generally relates to an electric vehicle monitoring system and more particularly, to a system and method for managing the power consumed by, and supplied from, electric vehicles via a power distribution system.

BACKGROUND OF THE INVENTION

With the price of vehicle fuel becoming a greater share of the average household income, more people are turning to fuel efficient vehicles to reduce transportation costs. Some of the most fuel efficient vehicles rely on electrical motors or hybrid technology. A fuel efficient vehicle relying on hybrid technology includes a fuel efficient internal combustion engine operating in conjunction with an electric motor. The electric motor relies on batteries that are contained in the vehicle for power.

Hybrid vehicles may operate either on battery power or the internal combustion engine. During operation of the internal combustion engine, the batteries are charged to provide electric power for the vehicle's needs, including propulsion. When the vehicle is not in use, a power cord may be used to plug some such vehicles into a conventional 120 volt (or 240 volt) alternating current (AC) power outlet. An AC to direct current (DC) converter allows the conventional AC power outlet to charge the batteries of the vehicle.

An all electric vehicle uses only battery power to power a motor that provides vehicular motion. Such electric vehicles must be periodically connected to a power distribution system ("power grid") to receive power to be stored in its batteries.

As electric vehicles (hybrids and all electric vehicles) become more ubiquitous, there is a growing need to plug in the electric vehicles when they are not in use. Typically, this is not a problem when the consumer (e.g., the vehicle operator) plugs their electric vehicle into a receptacle at their home because the power consumed during charging of the batteries of the electric vehicle is included in the consumer's electric utility bill. However, there are many instances when the consumer wants or needs to charge the batteries of the electric vehicle when the electric vehicle is not at the consumer's residence such as when the user visits another residence (e.g., a friend's home), drives to work, drives to a place of business (e.g., a restaurant, business office, shopping center, etc.), drives to a parking lot for mass transmit (e.g., a subway parking lot), or drives to another third party location.

Plugging the electric vehicle into the power grid when the electric vehicle is at a third party location typically will incur monetary fees associated with the power consumption of the electric vehicle (to charge the batteries) to the power customer (e.g., the owner) associated with the third party location. The power customer of the third party location is hereinafter referred to as the "third party power customer". The third party power customer often will not wish to pay for the power used to charge the consumer's electric vehicle. As power grids are currently implemented with a meter at each location, a system does not currently exist that allows an electric vehicle operator to charge their electric vehicle when the electric vehicle is away from their home (at a third party location) without that visited third party location incurring monetary charges.

Moreover, with the increase in vehicles relying on battery power, a vast amount of stored power is provided that may be distributed (discharged) back into the power grid. Thus, the power stored in electric vehicles may supply power to the power grid to thereby reduce the power demand at times of peak power demand. The location (e.g., a residence) at which the electric vehicle supplies power to the power grid is then credited (e.g., a reduction of the electric utility bill) for the power supplied by the electric vehicle. Currently there is no means for crediting the operator of the electric vehicle with the power supplied by the electric vehicle when the vehicle is away from their home (at a third party location). In addition, currently there is no means of communicating with and determining the location of the electric vehicles so that they can be intelligently controlled (e.g., by the operator of the power grid) to supply power to the power grid during times and at locations of peak power demand.

One of more embodiments of the present invention supply such solutions and other advantages.

SUMMARY OF THE INVENTION

The present invention provides a system and method for managing the distributed generation of power from a plurality of vehicles. In one embodiment, the method includes determining location information for the plurality of vehicles, determining that a demand for power in a first portion of the power grid has reached a power threshold, determining that the location information associated with a set of the plurality of vehicles satisfies a similarity threshold with the first portion of the power grid, and transmitting a request to a first group of vehicles in the set of vehicles to discharge power. In addition, the method may include receiving a response from at least some of the electric vehicles to which a request was transmitted, and determining whether to request the discharge of power from additional vehicles in the set of the plurality of vehicles based, at least in part, on the number of responses containing a confirmation of the discharge of power. The portion of the power grid may comprise a medium voltage power line or a substation.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

Figure 1:
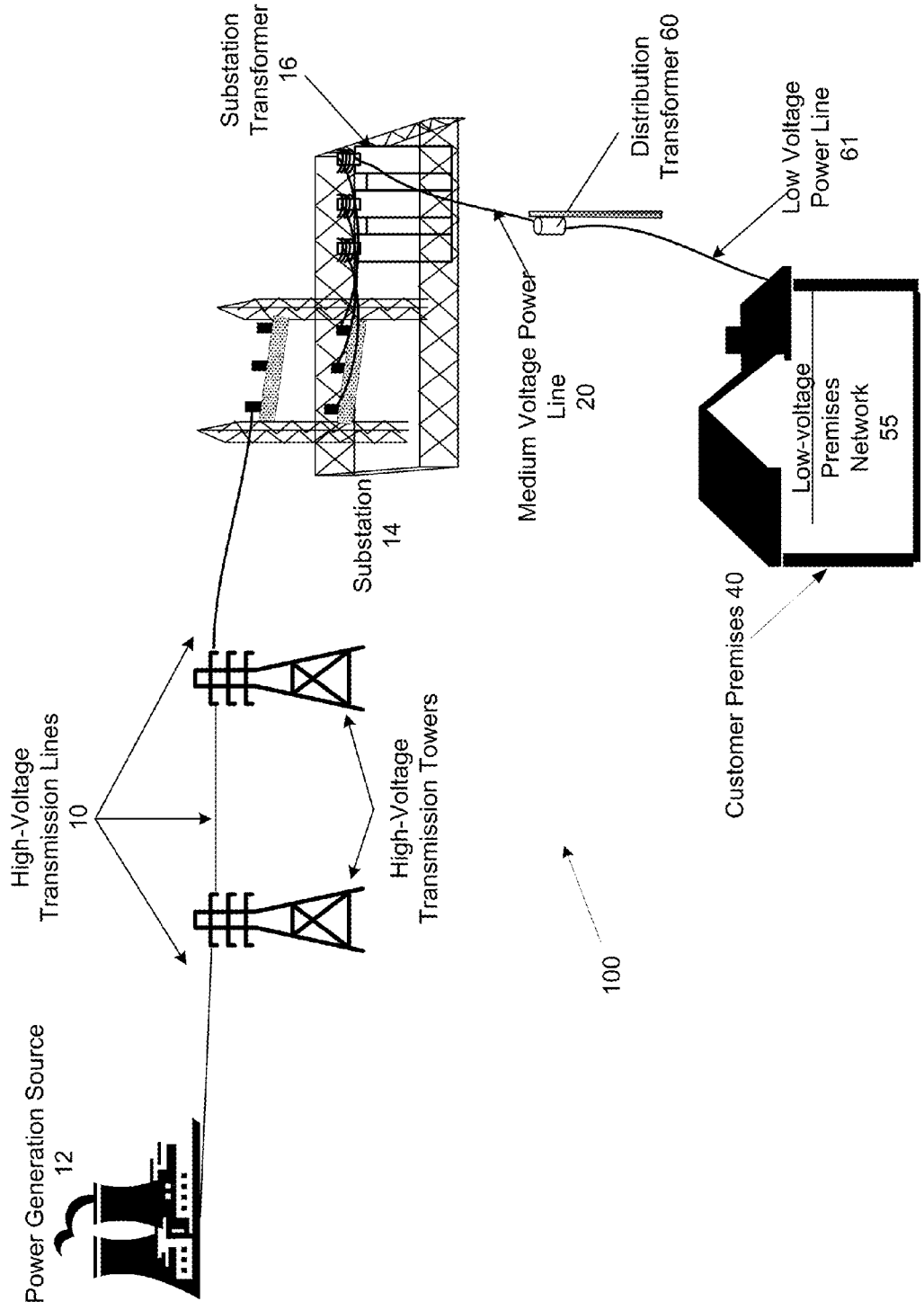
FIG. 1 illustrates an example of a portion of a power grid.

In the following description, for purposes of explanation and not limitation, specific details are set forth, such as particular networks, communication systems, computers, terminals, devices, components, techniques, data and network protocols, software products and systems, meters, vehicles, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, meters, vehicles, data and network protocols, software products and systems, operating systems, development interfaces, and hardware are omitted so as not to obscure the description.

Various embodiments of the present invention provide a system and method to communicate with electric vehicles, determine the location of electric vehicles connected to the power grid, determine a consumer associated with the electric vehicles, determine the amount of power that the electric vehicles can supply to the power grid, and/or determine the amount of power supplied and/or consumed by the electric vehicle.

Some embodiments of the present invention contemplate the use of a power line communication system (PLCS) that, for example, provides consumers and businesses with high speed broadband Internet access (and may also be used to perform meter reading) or a power line communication system designed only to provide automated meter reading (i.e., that may not be a BPL system). The PLCS allows the utility company to communicate with the electric vehicles. In other embodiments, other communication networks may be used to communicate with the electric vehicles.

In accordance with the principles of the present invention, an electric vehicle may include a controller and communication module (e.g., having broadband over Power line (BPL) modem chip set). The communication module may be used to communicate with a remote electric vehicle monitoring system (EVMS) that may be operated by a utility company (hereinafter the "utility") or a service bureau. The controller may used to determine the electric vehicle's location on a power grid such as, for example, via GPS forming part of a navigation system.

In one embodiment, a smart electric utility meter (i.e., an automated utility meter that includes communication capabilities) at the location of the electric vehicle may be used to communicate with the electric vehicle. The smart electric utility meter may collect various parameters from the electric vehicle including data of the power consumed and/or power supplied to the power grid by an electric vehicle. The automated electric utility meter may communicate with the EVMS to provide any information collected by the smart electric utility meter. In another embodiment, a Charge/Discharge Monitoring Device (CDMD) may be employed to gather and provide the various parameters from the electric vehicle including data of the power consumed and/or power supplied to the power grid by the electric vehicle. The CDMD could be fixed or mobile.

The EVMS may monitor the electric vehicles connected to its associated power grid to determine the identity of each electric vehicle, a consumer associated with each electric vehicle, and the location of each electric vehicle attached to the power grid. Further, through the use of mobile communication methods, the EVMS may track the location of vehicles that are not connected to the grid but could be requested to do so. In addition, the EVMS may maintain a profile for each electric vehicle (or consumer), maintain a location and/or power customer associated with each automated utility meter, transmit commands to electric vehicles to discharge their stored power onto the power grid, etc. In one embodiment, an electric vehicle being charged at a third party location will appropriately not incur monetary fees to the power customer associated with that third party location. In another embodiment, the exchange of fees may be performed directly between the vehicle operator associated with the electric vehicle and the power customer associated with the third party location. Likewise, the compensation for power provided by an electric vehicle discharging (supplying power) at a third party location will appropriately not be credited to the power customer associated with that third party location, but instead be credited to the vehicle operator. Thus, an electric vehicle may be charged and/or discharged anywhere on a power grid and the fees (e.g., credits and debits) will be appropriately apportioned.

An EVMS may be communicatively connected to other EVMSs across the US and other countries. In at least one embodiment, an EVMS will debit and credit the utility bill associated with the home residence of a consumer associated with the electric vehicle (as stored as profile information in memory of the EVMS). Connection of multiple EVMSs allows for an electric vehicle to be charged by and discharged onto a power grid other than the power grid supplying power to the vehicle operator's residence. More specifically, interaction of multiple EVMSs allows a consumer associated with an electric vehicle to be billed for charging their vehicle regardless of the power grid from which their electric vehicle receives power. Moreover, interaction of multiple EVMSs allows an electric vehicle being charge at a third party location of a visited power grid to appropriately not impose monetary fees to the power customer associated with that third party location. Likewise, an electric vehicle discharging at a third party location on a visited power grid will result in appropriate credit to the consumer and not to the power customer associated with that third party location on the visited power grid. Thus, connection of multiple EVMSs allows for appropriate apportionment of fees (credits and debits) when an electric vehicle is charged by and/or to discharged from a third party location supplied power by a visited power grid.

As shown in FIG. 1, a power distribution system, referred to herein as a power grid 100, typically includes components for power generation, power transmission, and power delivery. A transmission substation (not shown) typically is used to increase the voltage from the power generation source 12 to high voltage (HV) levels for long distance transmission on HV transmission lines 10 to a substation 14. Typical voltages found on HV transmission lines range from 69 kilovolts (kV) to in excess of 800 kV.

In addition to HV transmission lines 10, the power grid 100 includes medium voltage (MV) power lines 20 and low voltage (LV) power lines 61. MV typically ranges from about 1000 V to about 100 kV and LV typically ranges from about 100 V to about 240 V. Transformers 16 and 60 are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers 60 are often referred to as distribution transformers or a step down transformers, because they "step down" the voltage to some lower voltage. Transformers, therefore, provide voltage conversion for the power distribution system. Thus, power is carried from the substation 14 to one or more distribution transformers 60 over one or more MV power lines 20. Power is carried from the distribution transformer 60 to the customer premises 40 via one or more LV power lines 61. The customer premises 40 includes a low voltage premises network 55. The low voltage premises network 55 provides power to individual power outlets within the customer premises 40.

A distribution transformer 60 may function to distribute one, two, three, or more phases of power to the customer premises 40, depending upon the demands of the user. In the United States, for example, these local distribution transformers 60 typically feed anywhere from one to ten homes, depending upon the concentration of the customer premises 40 in a particular area. Distribution transformers 60 may be pole-top transformers located on a utility pole, pad-mounted transformers located on the ground, or transformers located under ground level.

The power grid 100, shown in FIG. 1, forms the backbone of a PLCS 110 that can be used to implement some embodiments of the present invention. A modulated carrier signal is impressed on the MV power lines 20 and/or the LV power lines 61. Any of a number of possible frequency bands can be employed, dependent upon signal transmission characteristics of the power grid 100. The data rates that are possible over the power grid 100 are dependent upon the particular characteristics of the power grid 100 and the PLCS equipment employed.

In some embodiments, the PLCS may used to implement a smart power grid 100. Electrical sensors (not shown) may be placed at various points through the power grid 100 to monitor for, for example, power outages at particular points, loads at particular points, power fluctuations at particular points, load balancing, faults, etc. In accordance with the principles disclosed herein, a smart power grid 100 implemented via a PLCS may facilitate communications and commands to electric vehicles 50, shown in FIG. 2, to discharge power stored therein onto the power grid 100.

Figure 2:
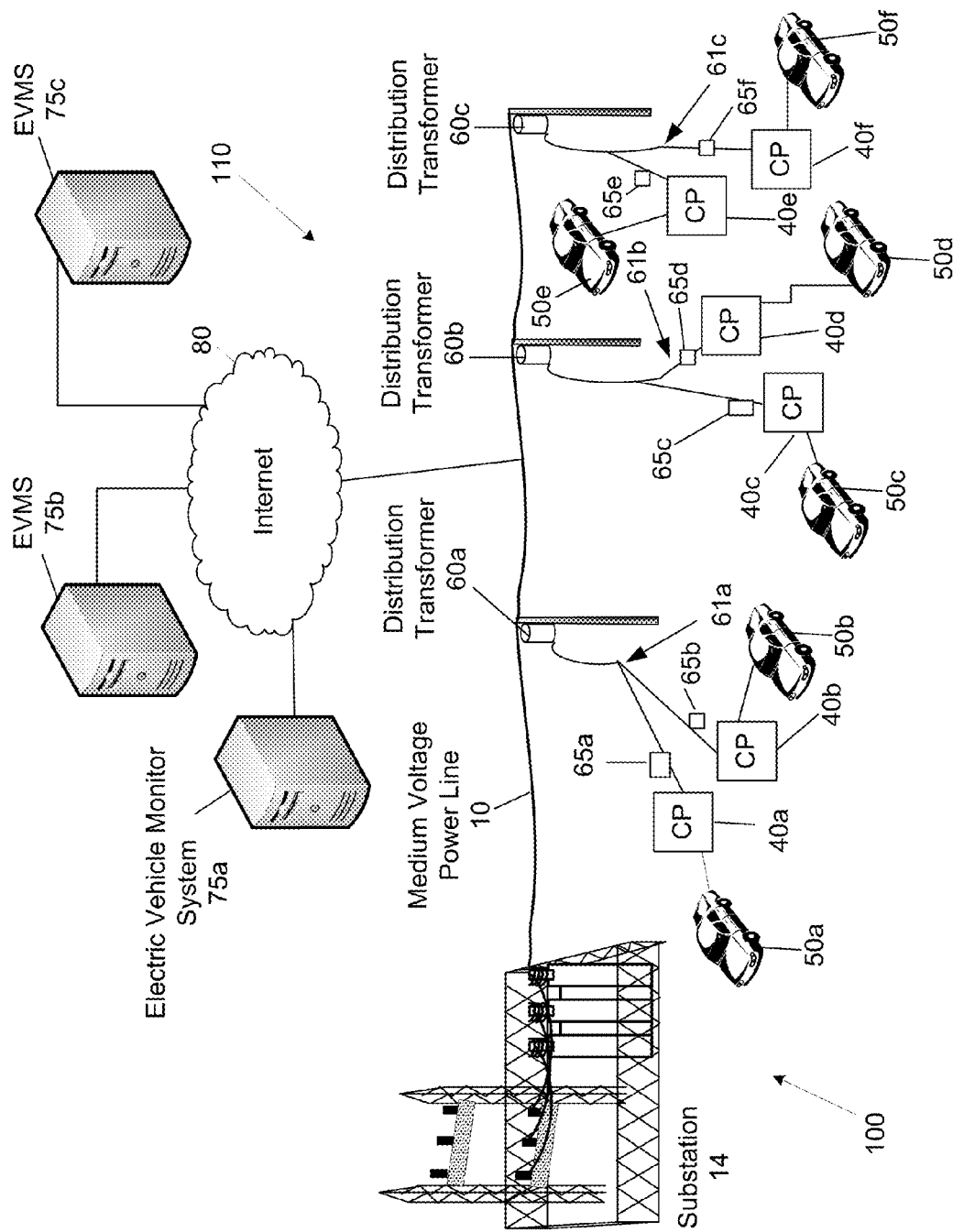
FIG. 2 illustrates an example environment for implementing some embodiment of the present invention.
Figure 3:
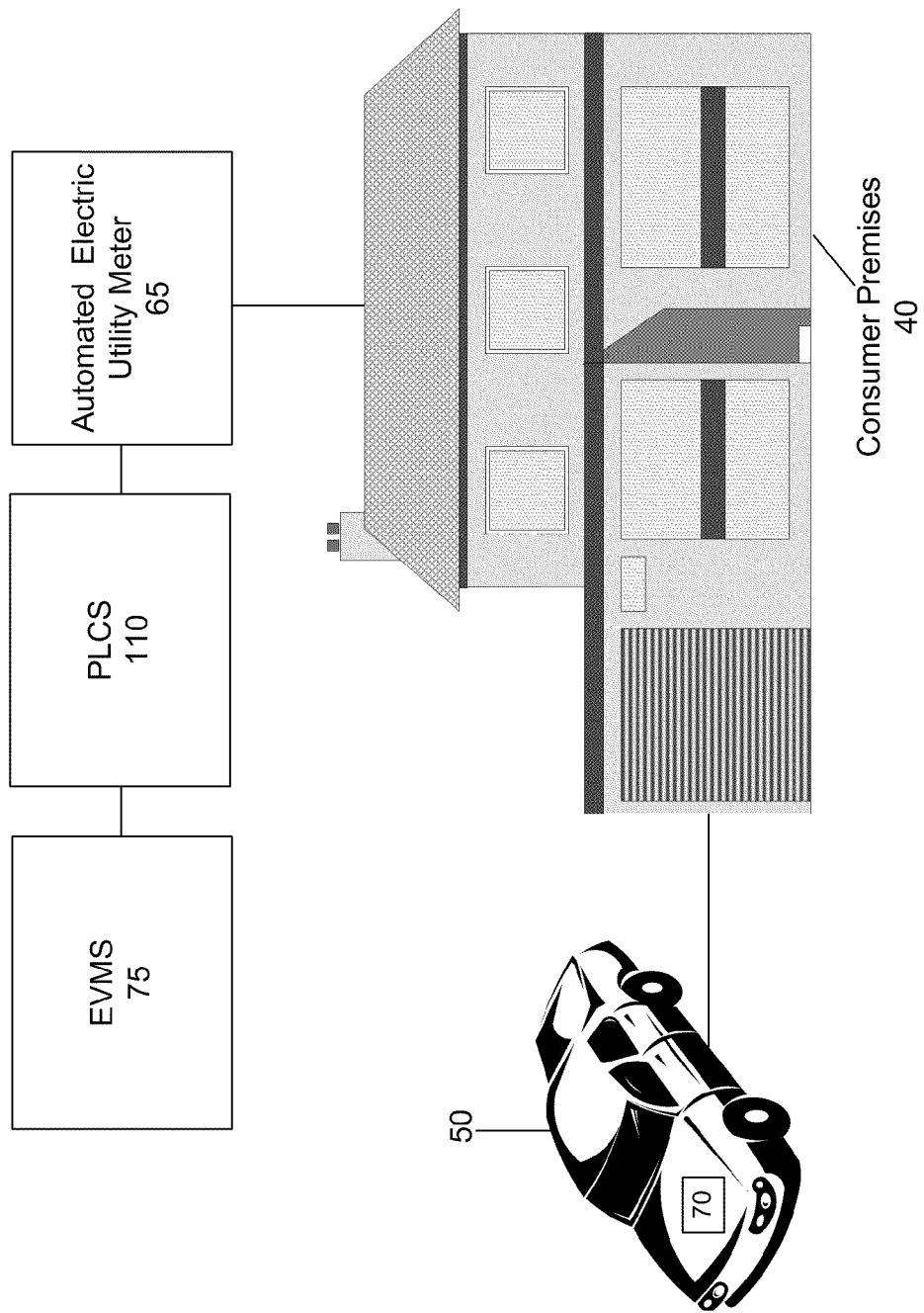
FIG. 3 provides a schematic representation of a portion of a system, in accordance with an example embodiment of the present invention.

FIGS. 2 and 3 illustrate a power line communication system (PLCS) with electric vehicles attached. In particular, FIG. 2 illustrates a portion of a PLCS 110 that includes a substation 14, a medium voltage power line 10, and a plurality of low voltage power lines 61a-61c. A plurality of customer premises 40a-40f may have internet access via the PLCS. In addition, each of the plurality of customer premises 40a-40f may have one or more electric vehicles 50a-50f connected to a power outlet at the customer premises. An EVMS 75a may be communicatively connected to the PLCS 110 via the internet. In addition, a plurality of EVMSs 75a-75c may communicate with one another via a network such as the Internet 80.

In this embodiment, the EVMS 75a maintains a database of information associated with each electric vehicle 50a-50f. Likewise EVMS 75b and EVMS 75c may maintain a database of information associated with electric vehicles 50 attached to their respective local power grids (not shown). An EVMS 75 may store such information as the name of a consumer associated with the electric vehicle 50 (e.g., a vehicle owner's name or vehicle lessee's name), an address associated with that consumer (e.g., the home address of the consumer associated with the electric vehicle 50), and electric vehicle 50 information (e.g., serial number model, make, year, miles on vehicle, gas remaining, etc.).

The EVMS 75 may store profiles associated with each respective electric vehicle 50a-50f (and/or consumer). Consumer's may set preferences in their respective profiles. Such preference data may include, for example, data indicating whether a utility company has permission to access (command discharge of) the energy stored within the batteries of the their electric vehicle 50, data of the times of a day, days of the week, etc. that the utility may access the energy stored within their electric vehicle 50, data of the maximum amounts of energy that the utility may discharge from their electric vehicle 50 over a given time period (e.g., hour, day, week, month, year, etc.), minimum price (or profit) for discharging, and/or data identifying the locations (or exclusions of locations) where the electric vehicle 50 may be discharged by the utility. The profile data also may be consistent with or determined by the terms of a contract entered into between the consumer and the utility or a third party entity that acts as a managing service bureau.

Consumer's may access and modify their customer profile data stored by the EVMS 75 through various computer based methods and/or non-computer based methods. For example, a consumer may access and modify their customer profile through a web site, a telephone voice prompt system, a voice recognition system, a utility company representative, etc.

Moreover, an EVMS 75 may maintain a contracts database of contractual obligations associated with a particular electric vehicle 50. The EVMS 75 may store data indicating compliance and/or non-compliance with those contractual obligations. For example, an owner of an electric vehicle 50 may enter into a contract to keep their electric vehicle 50 connected to a power grid 100 for a minimum number of hours per day, week, and/or year and to permit discharging of at least a predetermined amount of power per time period. The EVMS 75 may be configured to modify monetary fees (e.g., a penalty or incur fees for charging the electric vehicle 50 at a higher kilowatt rate) associated with energy usage by the consumer if the consumer associated with the electric vehicle 50 does not satisfy their contractual obligations. The EVMS 75 may cause transmission of a notice to the owner of the electric vehicle 50 indicating non-compliance with their contractual obligations. The notice may be communicated to the consumer associated with the electric vehicle 50 through email, an automated voice message, a letter, etc. The notice can, for example, indicate that the owner's non-compliance with the contract has resulted in an increase in their cost per kilowatt hour of power usage, according to agreed to contractual terms.

The PLCS 110 may allow any of the plurality of electric vehicles 50a-50f to communicate with the EVMS 75. Substantially in real-time, whenever any of the plurality of electric vehicles 50a-50f is attached to the power grid 100, Dynamic Host Configuration Protocol (DHCP) communications may be employed to assign an IP address to each electric vehicle 50 attached to the PLCS 110 to thereby provision the electric vehicle 50 onto the PLCS. In another embodiment a mobile communication method is used (e.g., via mobile telephone network, via an Onstar® type communication, via the internet and/or other suitable network) to provide real-time location information and status of the vehicle when the vehicles are connected and even when the vehicles are not connected to the grid. This allows utilities to view distributed generation sources that are immediately available as well as sources that could be requested to be available on short notice and that are likely to be available soon (e.g., a consumer on his/her way home). A media access controller (MAC) address of the communication module in each vehicle 50 also (or alternately) may be used to uniquely identify each electric vehicle 50 connected to the PLCS 110 and to allow the electric vehicle 50 to establish communications over the PLCS 110 (referred to herein as being "provisioned" onto the network). In some embodiments, the electric vehicle 50 establishes communications with the automated electric meter 65 that meters the electric power supplied to the customer premises at which the electric vehicle 50 is connected. For example, referring to FIG. 2, electric vehicle 50*a* may establish communications with automated meter 65*a* that meters power supplied to customer premises 40*a*. The automated meter 65*a* may already form part of and/or be in communication with the PLCS that is implemented on the power grid that supplies power to the customer premises 40*a*. Thus, after establishing communications with the meter 65*a*, the electric vehicle 50 will have access through the PLCS and Internet 80 to the EVMS 75*a*. In addition, because the location of automated electric utility meters 65 is fixed, the meters' locations are known to the EVMS 75. In addition, the EVMS will know the location of the electric vehicle 50 by knowing through which automated meter 65 the electric vehicle 50 is communicating. Thus, an EVMS 75 in communication with a smart electric utility meter 65 need not be supplied with location information from the electric vehicle 50 itself, as the location of smart electric utility meter 65 is already known.

The automated electric utility meter 65 may include a BPL modem (or other PLC modem) to communicate over the PLCS. The automated electric utility meter 65 may access data associated in the electric vehicle 50, such as, for example, the amount of power consumed by an electric vehicle 50 over a time period, the amount of power supplied by the electric vehicle 50 to the power grid 100 over a time period, vehicle identifying information (e.g., a MAC address, electric vehicle identification number (VIN)), an address associated with the electric vehicle 50 (e.g., the consumer's address), electric vehicle information (e.g., model, make, year, etc.), the storage capacity of the electric vehicle's 50 batteries, the amount of power presently stored in the electric vehicle's 50 batteries, an odometer reading of the electric vehicle 50, the amount of gasoline presently in the electric vehicle 50 (if relying on hybrid technology), etc. In another embodiment, the electric vehicle 50 communicates with the meter 65 via a wireless link.

The smart electric utility meter 65 may request data from the electric vehicle 50 and transmit the data to the EVMS 75 in response to a request from the EVMS 75, when the electric vehicle 50 establishes communications with the meter 65, upon receipt of new data from the electric vehicle 50; and/or periodically.

In an alternate embodiment, or as a way to provide for redundancy, a DSL modem, Cable modem, a wireless modem (e.g., Wifi or mobile telephone transceiver) may be employed in the electric vehicle 50 for communications with the EVMS 75. For example, the communication module may include a mobile telephone transceiver that communicates with the EVMS 75 via a mobile telephone network (in addition to or as an alternate to the Internet 80). In addition, the electric vehicle 50 also may include a navigation system with Global Positioning System (GPS) receiver or other location determining means (e.g., True Position®) configured to determine the location of the electric vehicle 50. In such an embodiment, the electric vehicle 50 may transmit location information to the EVMS 75 after communications with the EVMS 75 are established.

Once an electric vehicle 50 is provisioned onto the PLCS 110, a notification may be automatically sent from the electric vehicle 50 to the EVMS 75. Thus, the electric vehicle 50 may store an IP address for the EVMS 75 in its memory. The notification may provide notice that the electric vehicle 50 is newly attached to the PLCS 110 and may include information identifying the electric vehicle 50 (e.g., a serial number and/or MAC address). Provisioned electric vehicles 50*a*-50*f* may periodically send a notice update to the EVMS 75 (e.g., via an automated electric meter 65 and the PLCS 110) indicating that they are still attached to the power grid 100. If a predetermined period of time elapses between notice updates, an electric vehicle 50 may be determined by the EVMS 75 to no longer be attached to the PLCS 110. In another embodiment the EVMS monitors the location and availability of vehicles through real-time mobile communication methods.

In an alternate embodiment, EVMS 75 may periodically poll the PLCS 110 to determine which electric vehicles 50 are attached to the power grid 100. A response may be returned by the electric vehicle 50 (or the automated meter 65), indicating attachment of the electric vehicle 50 to the power grid 100.

In addition, the controller in each electric vehicle 50 may transmit a notification (or information identifying) when the vehicle begins charging, stops charging, begins discharging, and stops discharging as well as data indicating the amount of power consumed or discharged by the electric vehicle 50. In addition, the controller in each vehicle 50 may respond to requests for data (e.g., data of the power available in the batteries in the vehicle) and commands (e.g., commands to begin discharging or to stop charging) transmitted from the EVMS 75. The responses and notifications may be transmitted via the automated meter 65 through the Internet 80 to the EVMS 75 (or as discussed above via other communication networks).

Upon determination of disconnection of an electric vehicle 50 from the power grid 100, the EVMS 75 may update its database to indicate the time (i.e., start and stop times) that that particular electric vehicle 50 was charged by (or discharged onto) the power grid 100. The EVMS 75 may also update its database to indicate the amount of power consumed by the electric vehicle 50 and/or discharged by the electric vehicle 50. Instead of communicating with the smart meter 65 as described above, the EVMS may receive the information (and communicate with) the charge/discharge monitoring device (not shown) wirelessly (via a mobile telephone network) or via other means.

Figure 4:
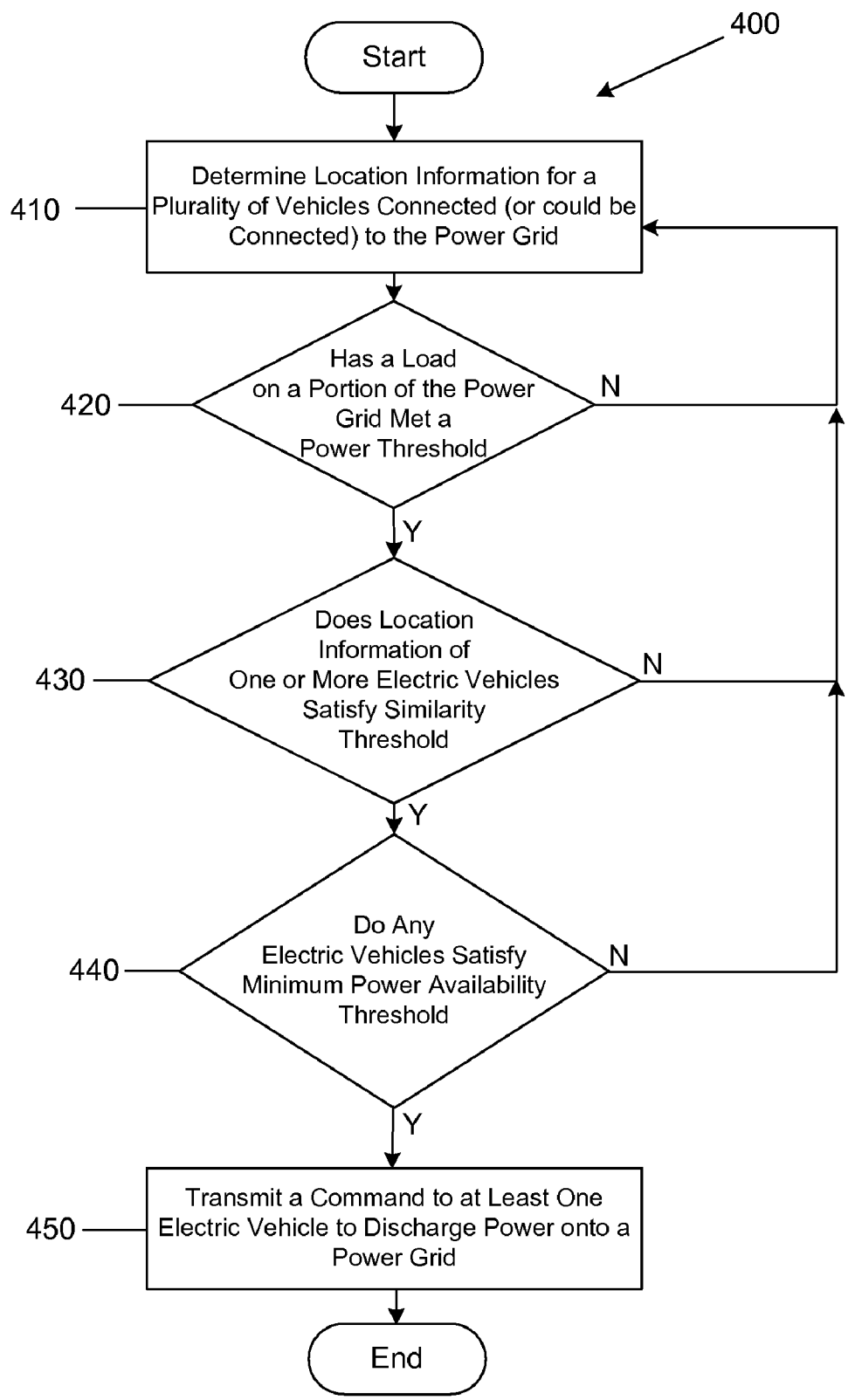
FIG. 4 illustrates an example method of commanding vehicle(s) to discharge power onto the power grid, in accordance with an example embodiment of the present invention.

FIG. 4 shows an example method of controlling the discharge and charging of electric vehicles 50 connected to the power grid 100 by the EVMS 75. In some embodiments, one or more of the processes of FIG. 4 may be performed by another computer system and/or a device forming part of the PLCS or remote from the EVMS 75. As discussed, at step 410 the EVMS 75 may receive data indicating the location of one or more electric vehicles 50 connected to the power grid 100 (e.g., received via the PLCS 110 or wirelessly) or, in another embodiment, within a predetermined footprint within the power grid (whether or not connected). In addition, the EVMS 75 may receive data indicating the power supplied by one or more power grid substations, one or more MV power lines, or one or more power distribution transformers (hereinafter collectively referred to as "portion of the power grid 100").

At step 420, the process includes determining if the load (power demand) on a portion of the power grid 100 (e.g., an MV power line, MV substation, or distribution transformer(s)) has reached (including exceeded) a power threshold. The EVMS may rely on automated meter power grid technology to make such determination. For example, the power grid 100 may receive data from a plurality of automated meters (e.g., via the PLCS or wirelessly) which may be summed together (or otherwise processed) to determine the power supplied by each distribution transformer, each MV power line, and each substation (i.e., each portion of the power grid). Alternately, each substation may monitor the power it supplies. The power being provided by any portion of the power grid 100 may be compared to a predetermined power threshold for that portion of the power grid 100 to determine if the power threshold for that portion of the power grid 100 has been met (including exceeded).

This power threshold for various portions of the power grid 100 may be stored in memory of the EVMS 75 and may be a sliding value dependent upon the time of day, the day of the week, time of year, the projected increases in power usage, etc. For example, at certain times of the day, the monetary cost per kilowatt increases due to increased power usage. At those times of the day, the power threshold may be reduced to allow the consumer to avoid being charged for power consumption for charging the electric vehicle 50 at a higher cost per kilowatt. If at step 420 the process determines that no loads on a power grid 100 have reached their respective power threshold, the process branches to step 410. Branching to step 410 allows the method to continue to determine the location of electric vehicles 50 connected to a power grid 100. In an alternate embodiment the position of all available vehicles in a ready state (i.e., charged and under contract) could be aggregated by the EVMS and presented as a value of distributed generation available in a specific geographic area to any utility who wishes to bid on such power. This available power may include the power associated with both connected and mobile vehicles in a geographic area.

In step 430, a determination is made if the location information associated with the one or more electric vehicles 50, as determined in step 410, satisfies a similarity threshold. The similarity threshold may comprise a determination as to whether each electric vehicle 50 is connected to the portion of the power grid 100 for which the power threshold has been met. If at step 420 the process determines that a similarity threshold is satisfied, the process continues at step 440. If step 430 determines that a similarity threshold is not satisfied, the process branches to step 410.

In step 440, the process includes determining whether any electric vehicles 50 that satisfy the similarity threshold (as determined in step 430) satisfy a minimum power availability threshold. As discussed, the EVMS 75 may receive parameter data that includes data of the available power in the batteries of each electric vehicle 50. Alternately, the EVMS 75 may receive data from each electric vehicle 50 that indicates whether the electric vehicle 50 has sufficient power stored in its batteries to provide power to the power grid 100. The minimum power availability threshold comprises the minimum amount of power that must be available in the batteries to allow the electric vehicle 50 to be commanded to discharge power into the power grid 100 or an indication from the electric vehicle 50 that it can supply power to the power grid 100. If at step 440 the process determines that one or more electric vehicles 50 satisfy the minimum power availability threshold, the process continues to step 450. If at step 440 the process determines that no electric vehicles 50 satisfy the minimum power availability threshold, the process branches to step 410 to continue to determine the location information of the electric vehicles 50 connected to the power grid 100.

At step 450, a discharge command is transmitted to the one or more electric vehicles 50 that satisfy the minimum power availability threshold, which that comprises a command to the electric vehicle 50 to discharge its stored power onto the power grid 100. Thus, if one or more electric vehicles 50 are determined to be connected to a portion of the power grid 100 that has reached (including exceeded), the power threshold, and the same electric vehicles 50 are determined to have (at least) the minimum power availability threshold stored therein, a command is transmitted from the EVMS 75 that instructs the electric vehicles 50 to discharge their power onto the power grid 100. The EVMS 75 command may also include command data for regulating the discharge such as, for example, the rate of discharge, the amount of discharge, start and/or stop times for the discharge, etc. The EVMS 75 also may receive data indicating an acknowledgment that the one or more electric vehicles 50 have begun discharging as well as the amount of power discharged by the electric vehicles 50, the time period(s) during which each quantity of power was discharged, etc. It is contemplated that some vehicles may be equipped to allow the vehicle operator to override such a discharge command and to not discharge power in response to the command. Consequently, in some embodiments it may be necessary to receive such acknowledgement of the discharge and, if necessary, to transmit commands to additional vehicles if additional power is needed because some vehicles do not comply with the command. In addition, the EVMS 75 may transmit a command to one or more electric vehicles 50 connected to the portion of the power grid 100 that has reached the power threshold (e.g., such as electric vehicles 50 that do not satisfy the minimum power availability threshold) to stop charging to thereby lessen the load on that portion of the power grid 100. In some embodiments, the commands are sent to the CDMD.

In an alternate embodiment, the EVMS may transmit the command of step 450 without performing step 440. Upon receipt of the command by the electric vehicles 50, each electric vehicle 50 may make the determination as to whether it has power available for discharging (perform step 440) and transmit the results of that determination (and the status of whether it has begun charging or not) to the EVMS 75.

A command to discharge an electric vehicle 50 can be transmitted by any EVMS 75a-75c to control the consumption of power from and discharge of power onto its respective power grid 100. Thus, if an electric vehicle 50 is connected to a visited power gird, i.e., at a power grid 100 that does not supply power to the address of the consumer associated with the electric vehicle 50, any of EVMS 75a-75c may communicate over the Internet 80 to access a customer profile stored on another EVMS 75a-75c (and, as discussed below, to provide a credit to the consumer). In this manner, an electric vehicle 50 may be commanded to discharge power stored therein onto a power grid 100, even if that power grid 100 is a visited power grid 100.

Figure 5:
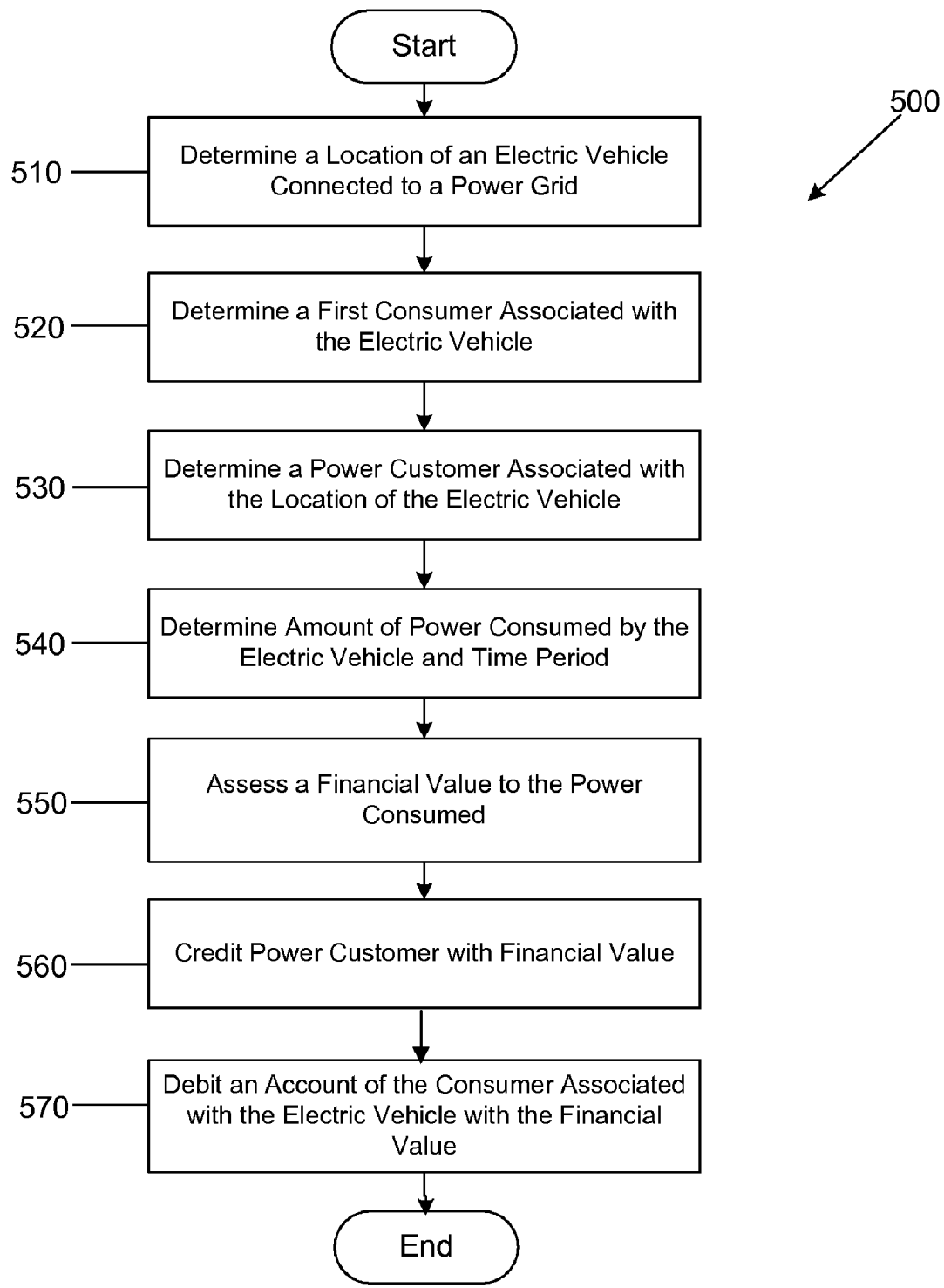
FIG. 5 illustrates an example method of managing fees for an electric vehicle charging at a third party location on the power grid, in accordance with an example embodiment of the present invention.

FIG. 5 shows an example method of crediting a third party location where an electric vehicle is charged, in accordance with the principles of the present invention.

When an electric vehicle 50 is driven to a third party location, it may need to be charged. In one embodiment, the present invention facilitates crediting of a power customer associated with the third party location with a financial value assessed to the amount of power consumed by the visiting electric vehicle 50 and debiting an account associated with the consumer associated with the electric vehicle 50. Crediting the account of the power customer associated with the third location effectively nullifies any monetary fees that would conventionally be imposed on the power customer for the charging the electric vehicle 50. Thus, a power customer associated with third party locations, in accordance with the principles disclosed herein, may freely allow an electric vehicle 50 to be charged, knowing that their account will not be monetarily billed for any power consumed by the visiting electric vehicle 50.

In an example method the process begins with step 510 in which a determination is made of the current location of an electric vehicle 50 connected to a power grid 100. As discussed above, this can be accomplished in a number of ways that may include a GPS transceiver in the vehicle (and wherein the vehicle transmits its location), communication with a smart electric utility meter 65 (wherein the EVMS retrieve the meter's location from memory), cellular location methods, or via other suitable means.

In an alternate embodiment, the electric vehicle 50 also (or in combination with automated location determination) may request and allow the consumer to enter an address into an electric vehicle's computer system, e.g., a navigation system. The consumer entered address may be entered through touch screen technology, voice recognition technology, etc. In some embodiments, the consumer entered address may be verified against the location as determined by the electric vehicle's navigation system (GPS) or other location means. The address data may then be transmitted to EVMS 75 (e.g., via a mobile telephone network).

At step 520, the process includes determining a first consumer that is associated with the electric vehicle 50. For example, the EVMS 75 may initiate a database query to retrieve information of the consumer associated with the electric vehicle 50 (who may be the owner, lessee, renter, or operator of the vehicle). Each electric vehicle 50 may include a unique MAC address (as part of its communication module 70—shown in FIG. 3). Submission of a database query with a MAC address as a search parameter may result in the consumer associated with the electric vehicle 50 being returned from the database query.

At step 530, a determination is made of a power customer that is associated with the current location of the electric vehicle 50. For example, the EVMS may initiate a database query to determine the power customer associated with the current location of the electric vehicle 50 from a customer database.

At step 540, the process includes determining the amount of power consumed by an electric vehicle 50 at the third party location and the time period (date, start time, and duration (or stop time) of each charging period)—which may be determined by, and transmitted by, the electric vehicle 50, CDMD, and/or automated meter 65 to the EVMS 75. The duration may be, for example, the length of time that the electric vehicle 50 is connected to the power grid 100, the length of time it takes to fully charge the electric vehicle 50, a pre-established length of time that an electric vehicle's 50 owner designates within a customer profile, etc. The date, start time, and duration may be used by the EVMS 75 to assess a financial value of the power consumed by the electric vehicle 50 at step 550 in order to correctly credit the power customer and debit the consumer associated with the electric vehicle 50.

At step 560, the EVMS credits an account of the power customer with the assessed financial value, which may comprise fees equivalent to the cost of the power consumed by the electric vehicle 50. For example, the power consumed by the vehicle 50 may by multiplied by a power rate (e.g., eleven cents per kilowatt/hour). In addition, at step 570, the EVMS debits an account associated with the consumer associated with the electric vehicle 50 with the financial value, which may comprise fees equivalent to the cost of the power consumed by the electric vehicle 50 at the third party location. The account associated with the consumer that is debited may comprise the consumer's home electric utility account, a credit card account, or any other suitable account associated with the consumer.

Figure 6:
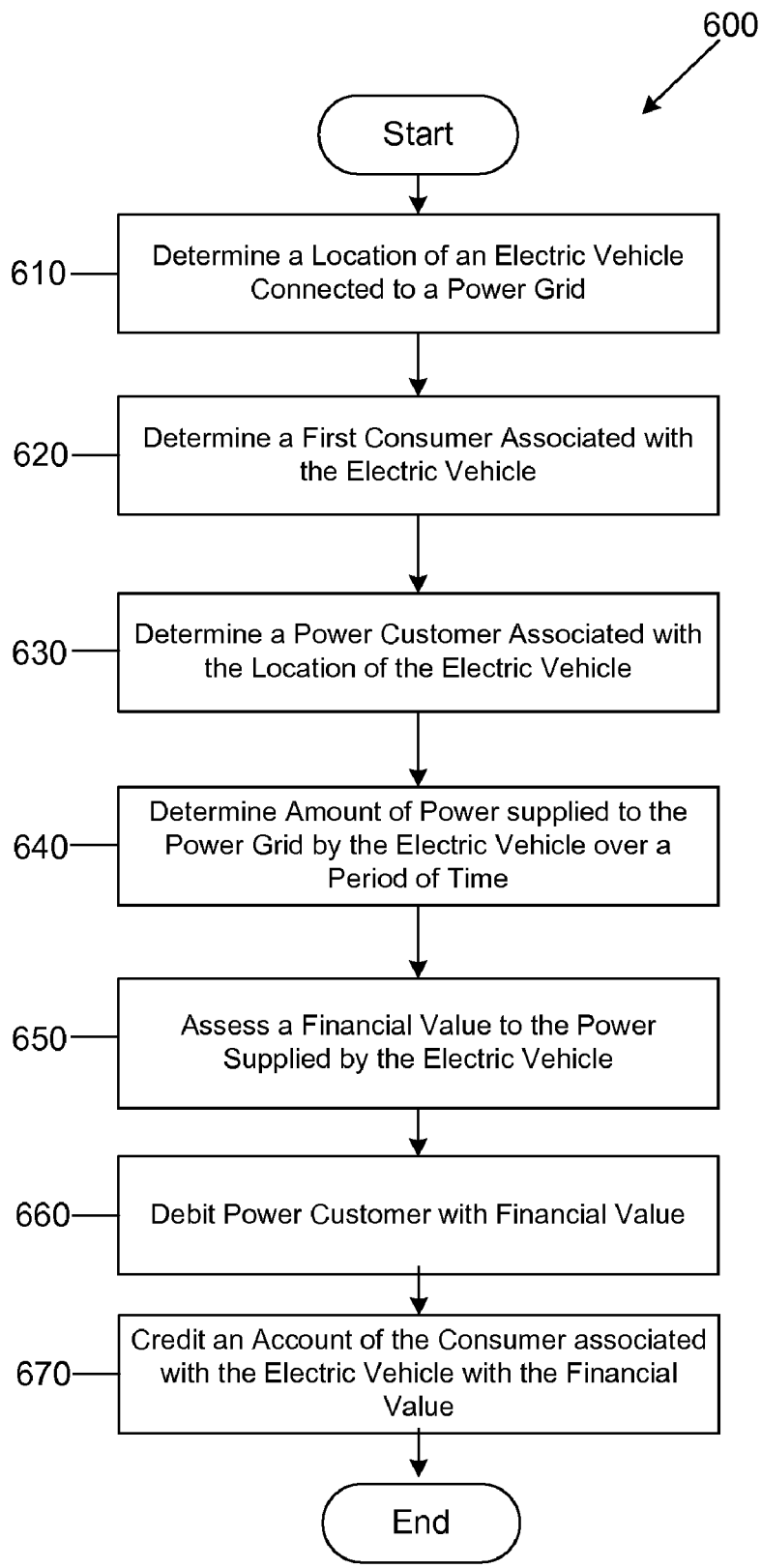
FIG. 6 illustrates an example method of managing fees for an electric vehicle discharging power onto the power grid at a third party location, in accordance with an example embodiment of the present invention.

FIG. 6 shows an example method of compensating a consumer for power supplied to a power grid by the consumer's electric vehicle, in accordance with the principles of the present invention.

When an electric vehicle 50 is driven to a third party location (e.g., a friend's home, a business, an office, a mall, etc.) the electric vehicle 50 may still be commanded to discharge power onto the power grid 100. In accordance with the principles disclosed herein, the consumer, and not the power customer associated with the third party location, is credited with the fees associated with power supplied to the power grid 100 by the electric vehicle 50.

More specifically, the power customer associated with the third party location may be debited with fees equivalent to the fees to be paid (by the utility) for the power supplied by the electric vehicle 50 onto a power grid 100. Thus, the consumer operating an electric vehicle 50, in accordance with the principles disclosed herein, may discharge power onto the power grid 100 knowing that the third party location will not be credited for any power discharged by the electric vehicle 50. EVMSs 75a-75c may communicate with one another to update a customer account data stored at a local EVMS (e.g., EVMS 75a) to properly update a customer account. Thus, customer accounts may be updated with debits and credits that are accrued while an electric vehicle 50 is charged and/or discharged from a third party location attached to a visited power grid 100. In this manner, the consumer associated with an electric vehicle 50 may be properly debited and/or credited for charging and/or discharging their electric vehicle 50 while at a third party location, even on a visited power gird 100.

In an example method, the process begins at step 610, which includes determining the current location of an electric vehicle 50 connected to or in the immediate vicinity of the power grid 100. As discussed above, this can be accomplished in a number of ways that includes GPS, communication with an automated electric utility meter 65, cellular location methods, etc. As discussed, the electric vehicle 50 may request and allow the consumer to enter an address into an electric vehicle's 50 location system, e.g., a navigation system. The consumer may enter the address via a touch screen technology, voice recognition technology, etc. The consumer entered address may be transmitted to the EVMS 75 and verified against the location, as determined by the electric vehicle 50.

At step 620, the process includes determining the consumer associated with the electric vehicle 50. EVMS 75 can initiate a database query to determine the consumer associated with electric vehicle 50 (e.g., the owner, lessee, or operator). Each electric vehicle 50 may include a unique MAC address stored in a modem chip set of the communication module and that is transmitted to the EVMS 75 upon establishment of communications. Thus, as an example, the EVMS 75 may employ a database query, with a MAC address as a search parameter, to determine the consumer associated with an electric vehicle 50.

At step 630, the process includes determining a power customer that is associated with the location of the electric vehicle 50. The determined current location of an electric vehicle 50 from step 610 may be formulated into a database query. EVMS 75 can initiate a database query to determine the power customer associated with the location of the electric vehicle 50 from an appropriate database. In another embodiment, the acquisition of a monetary exchange mechanism (i.e. credit card, debit card, PayPal account) replaces the need to determine the specific customer location as tracked by the incumbent utility. In other words, the consumer associated with the vehicle and the power customer associated with the third party location are determined without the need to determine the location of the vehicle. For example, the third party location may include CDMD that allows vehicle operators to connect to the grid to charge or discharge their vehicles. The CDMD monitors the power consumed or discharged. For charging, the CDMD allows the power customer associated with the third part location to receive payment from the consumer associated with the vehicle as discussed in more detail below.

At step 640, the process includes determining the amount of power supplied to the power grid 100 by the electric vehicle 50, at the location determined in step 610, over a period of time. The period of time can be, e.g., the length of time that the electric vehicle 50 is connected to the power grid, the length of time it takes to fully discharge the electric vehicle 50, a pre-established length of time that a vehicles owner designates within a customer profile, etc. The electric vehicle 50 (and/or an automated meter 65) or CDMD may monitor the amount of power that it has discharged from its batteries over a period of time. The amount of power discharged by the electric vehicle 50 and data of the time period is communicated to the EVMS 75 such as via the PLCS 110.

At step 650, the process includes assessing a financial value to the power supplied by the vehicle over the time period. For example, the computation may include multiplying the power supplied by the electric vehicle 50 by an agreed upon (or determined) power supply rate for the time period.

At step 660, the process includes debiting the account of the power customer associated with the third party location with the assessed financial value.

At step 670, the process includes crediting an account associated with the consumer associated with the electric vehicle 50 with the financial value, which may comprise fees equivalent to the cost of the power supplied by the electric vehicle 50 at the third party location. The account associated with the consumer that is credited may comprise the consumer's home electric utility account, a credit card account, or any other suitable account associated with the consumer. In accordance with the principles of the present invention, a visited location is not given credit with a power discharge associated with a visiting electric vehicle 50.

In the various embodiments, the financial value assessed may be the same for the power customer and the consumer or may be somewhat (or very) different. The amount debited to the power customer may be based on the type of utility meter installed at the structure. More specifically, for electro-mechanical meters, the entire amount discharged may be debited to the power customer associated with the location because electro-mechanical meters typically measure the net power consumed by the structure even when power flows from the location into the grid. In contrast, most modern electronic utility meters measure the amount of power flowing into the structure and out of the structure separately and (unless the power customer has registered with the utility to provide power to the utility) the power customer is billed for the power consumed without regard to how much power was provided to the power grid.

Thus, all or some the power discharged from the vehicle may be consumed by the customer premises in which case the utility or service bureau would rely data from the CDMD (used by the vehicle to monitor the power discharged) to determine the amount of power discharged by the vehicle. If all of the power discharged by the vehicle is consumed by the power customer location, the utility (or service bureau) may debit the power customer associated with the location with an amount that is based on the amount of power discharged. If the structure has an electronic meter installed and only a portion of the power discharged by the vehicle is consumed by the customer premises (e.g., 40%), the utility (or service bureau) would debit the power customer associated with the location with an amount that is based on only that consumed portion (the 40%) of the amount of power discharged. In addition, the power rate (e.g., cost per unit of power) may be different for debits and credits to allow for profits to the utility and the party supplying power (either the consumer or power customer) based on a desired business model (e.g., assess an increase in cost for charging the electric vehicle 50 away from home).

A web portal may used created to allow the vehicle owner to move (or credit) a homeowner's charge. This may implemented via an "honor system". For example, the parties may enter an energy amount, payment method and energy provider (power customer) to credit. In a more complex system, the vehicle may record the GPS coordinates of the place it charged and the portal may validate the collected coordinates with the stored coordinates of power customer premises. As an example; the system may proffer a list of addresses that are near the entered coordinates and ask the vehicle operator to choose the premise to be credited from a list. The data may be entered in real-time (prior to or during charging/discharging from the vehicle) or subsequent thereto.

The above described embodiments contemplates two scenarios including a first in which the remuneration takes place between the three parties; the vehicle operator, the third party premise owner and the utility. In this model, the vehicle owner pays the power company and the power company credits the premise owner. The above embodiments also contemplate remuneration between the vehicle operator and power customer associated with the third party location. In such an embodiment, the remuneration takes places between the vehicle operator and the power customer associated with the third party location thereby removing the utility company from the transaction. In this second scenario, the power customer associated with the third party location becomes a "temporary" wholesaler of power and buys (or in some instances sells) power from (to) the power company "as usual."

In this embodiment, it typically would not be necessary to identify the exact premise involved (or location of the vehicle or premises) in the transaction but only a monetary exchange medium (credit card/debit card/pay pal account) to credit. For example, step 510 of FIG. 5 may be omitted in some such embodiments and, step 530 (and step 630 of FIG. 6) may instead comprise, determining the power customer supplying power to (receiving power from) the electric vehicle.

A first variant of this embodiment makes use of fixed location charging stations. These stations comprise devices that are conveniently located in business parking lots or in places where parking meters may be found today. Such devices are also connected to an electric power source such as the power grid and function similar to a gas pump that supplies gas. In one embodiment, the vehicle operator plugs in the electric vehicle 50 and swipes a credit card or debit card through the device (e.g., a conventional credit/debit card reading device). Upon receiving authorization, the charging station would allow power to flow to the vehicle. When the electric vehicle is unplugged, the charging station stops charging until another credit/debit card is authorized, which would prevent a third party from unplugging the vehicle and charging their vehicle on the vehicle operator's credit card. In this fixed model, the amount paid by the vehicle operator would go to the owner of the "charging station" who would pay the utility as necessary for the power consumed. As in a gas station scenario, the charging station owner typically would charge the vehicle operator more than what he/she pays the utility in order to make a profit.

In a second variant of this embodiment, the owner of third party power source (e.g., a home, business, etc.) and the vehicle owner each have an account number to be credited or debited. The account may comprise a credit card account, debit card account, checking account, Paypal® account or other suitable account. A CDMD may be mobile and travel with the vehicle. The CDMD may be integrated into the vehicle or may be a separate (removable) device. The vehicle operator plugs the vehicle into the CDMD (if necessary such as where it is a separate device) and plugs the CDMD into a power source. In this instance, a CDMD device ID (e.g., a MAC address) may be used (e.g., a query) by the EVMS to determine the identification of the vehicle operator's account to be debited. The CDMD also may include a magnetic card reader or numeric input device (keypad) to allow entry of an account to be credited (e.g., for purchase of the power) and/or for debiting. This CDMD may use a mobile telephone network, the internet, and/or other suitable communication network(s) to provide real time communication for debiting and crediting. The CDMD may transmit data of the transaction to the EVMS (operated by a service bureau), which data may include some or all of: the account number(s), the amount(s) to be credited and/or debited, the amount of power consumed, and the direction of the exchange. The service bureau may retrieve the prevailing rates (from memory locally or remotely) of the local utility and transfer funds between the accounts. In this scenario, a single EVMS operated by a service bureau may serve an entire country.

As discussed, certain vehicles operating with this remuneration model may opt in to a program that would provide remuneration to a consumer associated with the vehicle for allowing the discharge of power back into the grid. This embodiment utilizes a non-utility service bureau to facilitate this function, which would allow for a cross utility system.

Figure 7:
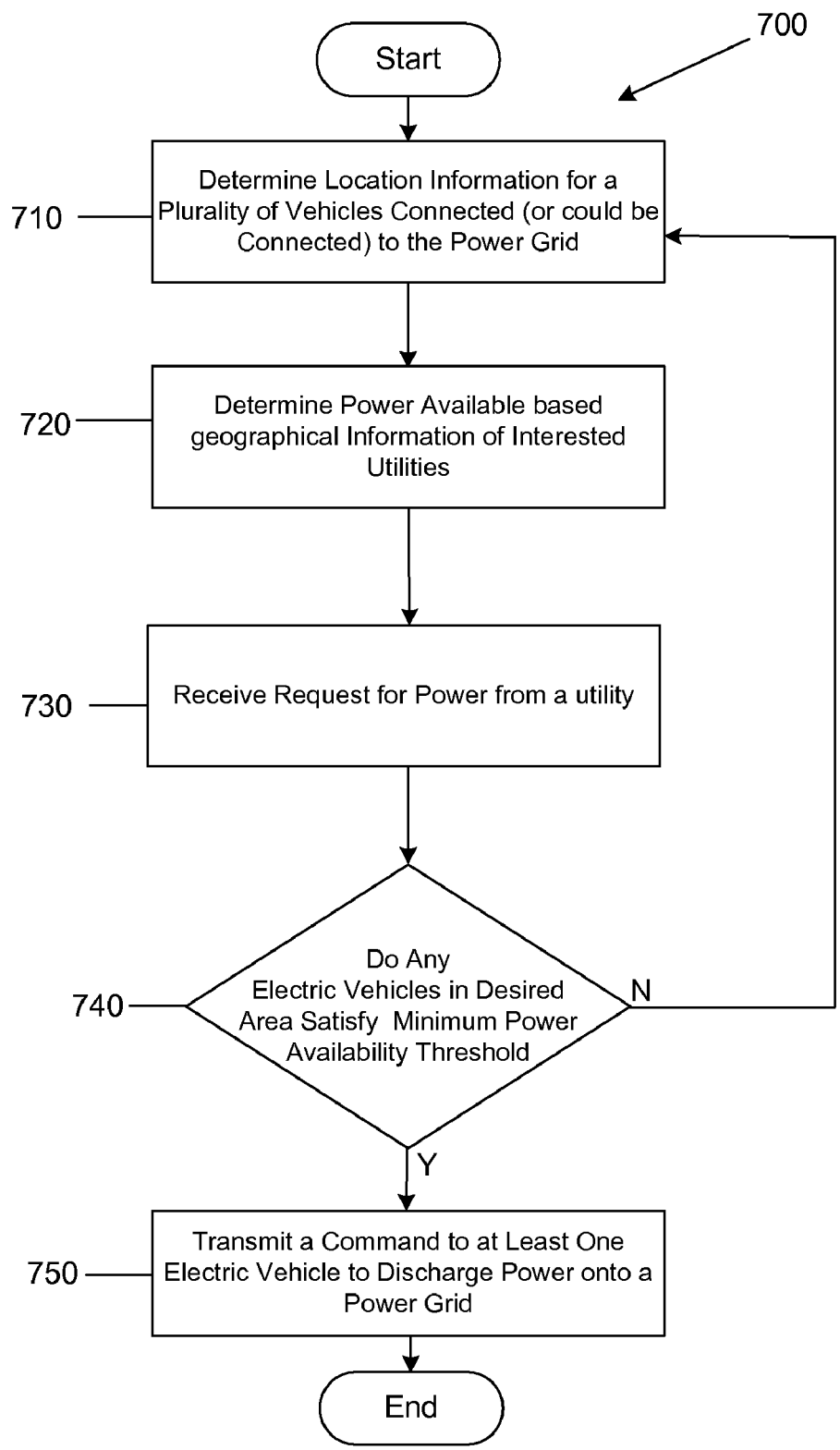
FIG. 7 illustrates an example method of managing distributed generation from electric vehicles, in accordance with an example embodiment of the present invention.

At step 710 of FIG. 7, the EVMS, operated by the service bureau may determine location information for vehicles with a portion of a power grid (e.g., within the footprint, within a zip code, etc.). The available power from these vehicles may be reported to utilities through an API, based on geography of the available power (i.e., location of vehicles). Alternately, as illustrated by step 720 of FIG. 7, the service bureau may determine the available power sources (contracted electric vehicles) and advertise their aggregated capabilities based on geographic locations. At step 730, a utility may invoke an API requesting a certain amount of power in a certain geographic region (i.e. geo-code or zip code) and indicate the rate that the utility is willing to pay for the requested power. The system of the bureau may then determine the most applicable power sources (contracted vehicles based on rates) and determine (confirm) the number (or if any) of the vehicles 50 within the desired location satisfy the minimum power availability threshold. This step 740 may also be performed earlier in the sequence of steps. The EVMS may then transmit discharge commands to a commensurate number of vehicles (satisfying the minimum power availability threshold) to provide the requested power (e.g., at the lowest or requested cost) at step 750. The service bureau receives information from the vehicles (or CDMDs) of amount of power discharged in order to bill the utility and may pass some of the received revenues to the accounts of the consumers associated with the discharging vehicles.

In some instances, the computer system of the bureau may send real-time messages to vehicles that are in the area of interest (e.g., the geo-code or zipcode for which power is requested) but are not connected to the power grid (perhaps in motion being driven by the operator). The messages may include discharge requests, such as, for example, "Pull over and tether your vehicle now for $10 kWh."

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method, implemented at least in part by a computer system, of managing the stored power of a plurality of vehicles connected to a power grid, comprising:
   determining location information for each of the plurality of vehicles connected to the power grid;
   determining that a demand for power in a first portion of the power grid has reached a power threshold;
   determining that the location information associated with a set of the plurality of vehicles satisfies a similarity threshold with the first portion of the power grid;
   transmitting a request to at least one vehicle of the set of vehicles to discharge power;
   receiving one or more responses from at least some of the electric vehicles to which a request was transmitted;
   wherein at least one of the one or more responses comprise information indicating a discharge of power; and
   determining whether to request a discharge of power from additional vehicles of the set of the plurality of vehicles based, at least in part, on the number of responses indicating a discharge of power.

2. The method according to claim 1, further comprising:
   determining that a subset of the set of vehicles have stored power that satisfies a power availability threshold; and
   wherein said transmitting a request comprises transmitting a request to at least one vehicle of the subset of vehicles to discharge power.

3. The method according to claim 1, wherein the first portion of the power grid comprises a medium voltage power line.

4. The method according to claim 1, wherein the first portion of the power grid comprises a plurality of power lines connected to a substation.

5. The method according to claim 1, wherein said determining that the location information associated with a set of the plurality of vehicles satisfies a similarity threshold with the first portion of the power grid comprises:
   determining that the location information of each vehicle of a set of the plurality of vehicles corresponds to an address of a power customer that is supplied power by a distribution transformer that has reached a power threshold.

6. The method according to claim 1, wherein said determining that the location information associated with a set of the plurality of vehicles satisfies a similarity threshold with the first portion of the power grid comprises:
- determining that the location information of each vehicle of a set of the plurality of vehicles corresponds to an address of a power customer that is supplied power by a medium voltage power line that has reached a power threshold.

7. The method according to claim 1, wherein determining that the location information associated with a set of the plurality of vehicles satisfies a similarity threshold with the first portion of the power grid comprises:
- determining that the location information of each vehicle of a set of the plurality of vehicles corresponds to an address of a power customer that is supplied power by a substation that has reached a power threshold.

8. A method, implemented at least in part by a computer system, of managing the stored power of a plurality of vehicles connected to a power grid, comprising:
- determining location information for the plurality of vehicles;
- determining that a demand for power in a first portion of the power grid has reached a power threshold;
- determining that the location information associated with a set of the plurality of vehicles satisfies a similarity threshold with the first portion of the power grid;
- transmitting a request to a first group of vehicle in the set of vehicles to discharge power; and
- crediting a consumer associated with each vehicle that discharges power in response to the request.

9. The method according to claim 8, further comprising:
- receiving a response from at least some of the electric vehicles to which a request was transmitted; and
- wherein the response comprises a confirmation of the discharge of power.

10. The method according to claim 9, further comprising:
- determining whether to request a discharge of power from additional vehicles in the set of the plurality of vehicles based, at least in part, on the number of responses containing a confirmation.

11. The method according to claim 8, further comprising:
- receiving one or more responses from one or more transmitted requests; and
- determining whether to request a discharge of power from additional vehicles in the set of the plurality of vehicles based, at least in part, on the one or more responses.

12. The method according to claim 8, wherein said transmitting a request comprises transmitting a request to be presented to the operator of the vehicle for a first subset of the vehicles.

13. The method according to claim 12, wherein said transmitting a request comprises transmitting a request to a computer disposed in the vehicle for a second subset of the vehicles.

14. The method according to claim 12, wherein the first subset of the vehicles comprise vehicles that are not connected to the power grid.

15. The method according to claim 8, wherein said transmitting a request comprises transmitting a request to a computer disposed in the vehicle.

16. The method according to claim 8, further comprising:
- determining identifying information of one or more of the plurality of vehicles;
- determining one or more contractual terms associated with the one or more vehicles; and
- wherein said transmitting a request is performed in accordance with the one or more contractual terms associated with the one or more vehicles.

17. The method according to claim 16, wherein said determining one or more contractual terms comprises retrieving data of the one or more contractual terms from memory based on the identifying information of the vehicle.

18. The method according to claim 8, further comprising:
- not transmitting a request to at least one vehicle because such discharging in response to the request would be contrary to at least one contractual term associated with that vehicle.

19. The method according to claim 8, further comprising:
- determining identifying information of one or more of the plurality of vehicles;
- determining a profile associated with each of the one or more vehicles;
- wherein each profile includes data originated from a consumer associated with the vehicle that relates to at least one of the group of: restrictions and preferences for the discharge of power from the vehicle; and
- wherein said transmitting a request is performed in accordance the profile associated with each vehicle.

20. The method according to claim 8, wherein a first subset of the plurality of vehicles is connected to the power grid and a second subset of the plurality of vehicles is not connected to the power grid.

21. The method according to claim 8, wherein the first portion of the power grid comprises a plurality of power lines connected to a substation.

22. A method, implemented at least in part by a computer system, of managing the stored power of a plurality of vehicles connected to the power grid, comprising:
- determining location information for the plurality of vehicles;
- receiving a power request comprising a request for electrical power for a power grid;
- selecting a set of the plurality of vehicles based, at least in part, on the location data of each of the plurality of vehicles;
- in response to receiving the power request, transmitting a request to discharge power to the set of the plurality of vehicles;
- in response to said transmitting, receiving a response from a group of the set of plurality of vehicles; and
- crediting a consumer associated with each vehicle that discharges power in response to the request.

23. The method according to claim 22, further comprising:
- determining whether to request a discharge of power from additional vehicles in the set of the plurality of vehicles based, at least in part, on the number of responses containing a confirmation of a discharge of power.

24. The method according to claim 22, further comprising:
- determining identifying information of one or more of the plurality of vehicles;
- determining one or more contractual terms associated with the one or more vehicles; and
- wherein said transmitting a request is performed in accordance with the one or more contractual terms associated with the one or more vehicles.

25. The method according to claim 24, wherein said determining one or more contractual terms comprises retrieving data of the one or more contractual terms from memory based on the identifying information of the vehicle.

26. The method according to claim 24, further comprising:
- not transmitting a request to at least one vehicle because such discharging in response to the request would be contrary to a contractual term associated with that vehicle.

27. The method according to claim 22, further comprising:
  determining identifying information of one or more of the plurality of vehicles;
  determining a profile associated with each of the one or more vehicles;
  wherein each profile includes data originated from a consumer associated with the vehicle that relates to at least one of the group of: restrictions and preferences for the discharge of power from the vehicle; and
  wherein said transmitting a request is performed in accordance the profile associated with each vehicle.

28. The method according to claim 27, further comprising:
  not transmitting a request to at least one vehicle because such discharging in response to the request would be contrary to data of the profile associated with the at least one vehicle.

29. The method according to claim 22, wherein said transmitting to a given vehicle is only performed when consistent with a profile and one or more contract terms associated with that vehicle.

30. The method according to claim 22, wherein said transmitting a request is performed in accordance with a compensation requirement of a consumer associated with each vehicle; and
  wherein the compensation requirement comprises data indicating the minimum compensation that the consumer must receive for the discharge of power.

31. The method according to claim 30, further comprising selecting vehicles to receive a request based on the compensation requirement of the consumer associated with each vehicle.

* * * * *